Figure 1:
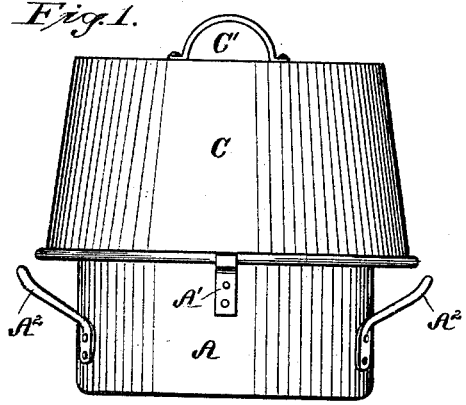

No. 619,372. Patented Feb. 14, 1899.
M. WALSH.
DISH HEATER.
(Application filed Apr. 13, 1898.)
(No Model.)

WITNESSES:
R. H. Newman
J. B. Clautice

INVENTOR
Margaret Walsh
BY
Thomas Drew Stetson
ATTORNEY.

THE NORRIS PETERS CO., PHOTO-LITHO., WASHINGTON, D. C.

UNITED STATES PATENT OFFICE.

MARGARET WALSH, OF NEW YORK, N. Y.

DISH-HEATER.

SPECIFICATION forming part of Letters Patent No. 619,372, dated February 14, 1899.

Application filed April 13, 1898. Serial No. 677,496. (No model.)

*To all whom it may concern:*

Be it known that I, MARGARET WALSH, of the borough of Manhattan, in the city and State of New York, have invented a certain new and useful Improvement in Dish-Heaters, of which the following is a specification.

My apparatus is adapted to receive plates of all sizes, nested one into another in the obvious manner, and to impart heat thereto rapidly and approximately evenly and without risk of injury from overheating through the medium of steam. The steam at atmospheric pressure is generated in a freely-open pan below and rises around the plates and penetrates the always sufficiently open spaces between the cold dishes. I provide a convenient and easily-removable hood, which retains the steam around the pile of dishes, but allows it to freely mingle with the air and escape at the bottom. The apparatus is simple and effective and is neat in appearance and in fact. The dampness imparted by the vapor to the plates is in practice just sufficient to give them a proper condition with the light wiping to which they are ordinarily subjected before placing on the table.

A removable ring is applied on the pan to reduce the working area of the top when only small plates are to be treated. The pan may sit on a stove or range; but I have in my experiments rested it upon an ordinary gas-stove, which heats more rapidly. Only a small quantity of water need be used if the heating is required to be done quickly; but I make the pan of sufficient depth to permit a liberal amount to be used in most cases to avoid the risk of burning.

Heretofore for cooking and certain other purposes steamers were known in which a water-containing vessel was combined with a hood for confining the steam; but such hooded steamers, so far as I am aware, were neither intended nor adapted for the warming of dishes. In my new or improved apparatus, in conjunction with a water-containing vessel and hood, I provide a dish-support at or near the top of the water-containing vessel in such manner that the edges of plates supported thereby will be above the top of the said vessel and that the plates or dishes can in consequence be readily replaced and removed without danger of burned fingers and an overturned vessel. This dish-support is most advantageously in the form of a ring, which may be the top edge or rim of the water-containing vessel or an attachment thereto. A supplementary ring is most convenient when the plates or dishes to be heated are none of them large enough to be supported directly by the water-containing vessel. Furthermore, I find it advantageous to use for containing the water a flat vessel—that is to say, a pan whose diameter considerably exceeds its depth—and for the hood a vessel of greater depth than the said water-containing vessel.

The accompanying drawings form a part of this specification and represent what I consider the best means of carrying out the invention.

Figure 2:
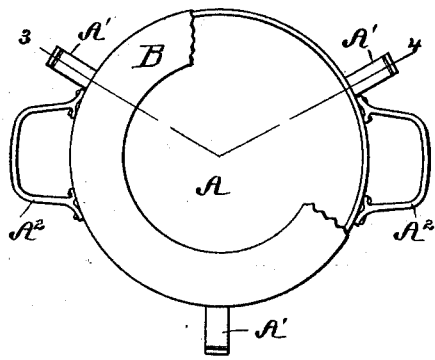
Figure 3:
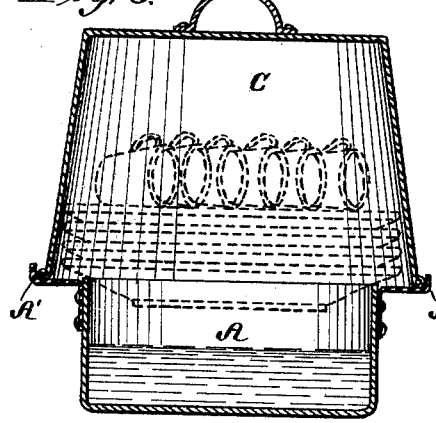
Figure 4:
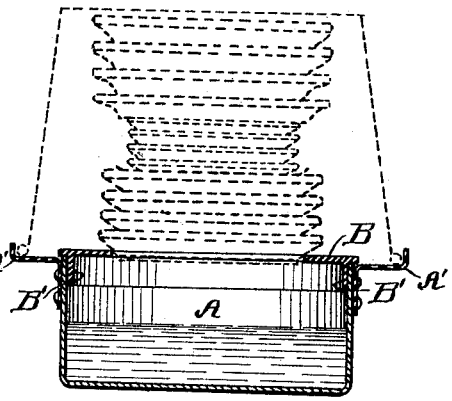
Figure 5:
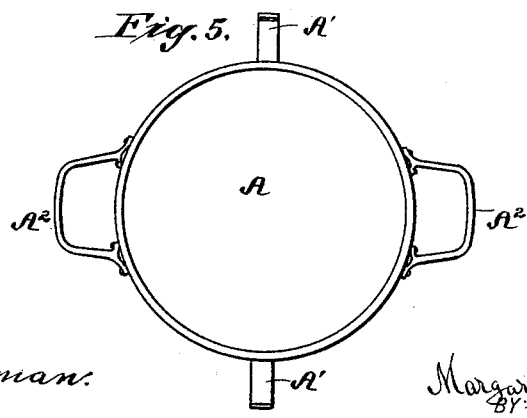

Figure 1 is a side elevation with the hood in place. Fig. 2 is a plan view with the hood removed. A portion of this figure shows the ring in place. Figs. 3 and 4 are sections on the angular line 3 4 in Fig. 2. Fig. 3 shows the apparatus conditioned for large plates and Fig. 4 for small plates. Fig. 5 is a plan view showing a modification.

Similar letters of reference indicate corresponding parts in all the figures where they appear.

A is the circular pan, of heavy sheet-copper, with flat bottom and perpendicular sides.

A' A' A' are horizontal arms riveted on and extending outward, with their ends turned upward.

$A^2 A^2$ are convenient handles.

B B' is a ring, which may be also of sheet-copper, with the main part B horizontal and adapted to lie on the top of the pan and extending inward, and the lip B' vertical and adapted to enter within the top of the pan and guard against the displacement of the ring laterally.

C is the hood, in the form of a frustum of a cone, with the top closed and the bottom open.

C' is a handle.

The dishes are indicated by dotted outlines.

If one or more sufficiently-large plates are placed on the pan or on the ring so as to be thereby supported, smaller dishes may lie regularly or irregularly thereon. Large dishes may be treated with the ring in place; but it is preferable in serving a large family or party using large plates to remove the ring and let the dishes descend deeper into the pan, allowing more room for other dishes above. Either with or without the ring the placing of the hood subjects the mass of dishes to the steaming treatment, and the simple lifting and laying aside of the hood renders the pile of dishes freely accessible.

The level parts of the arm support a hood and allow it to be moved laterally. The outer end of each arm being turned upward constitutes a stop to limit such motion. The hood resting on the arms is not only supported thereby, but is guarded against any considerable displacement laterally.

The invention is more especially adapted for serving with a small gas-stove in butlers' pantries in houses of the better class; but it may be used with or without other means for warming plates in dwellings of all styles and in hotels and restaurants of all sizes.

An additional use to which the invention may be applied is the holding of food in a hot condition without drying or burning. The food may be introduced into the plate-warmer in any ordinary dish, resting it, if necessary, on a large plate, and will thus be kept hot for a number of hours without appreciable deterioration. Where a gas-stove is used, but a small consumption of gas is required after the apparatus and its contents have become properly heated.

Modifications may be made without departing from the principle or sacrificing the advantages of the invention. I attach importance to the free opening at the bottom of the hood and in the considerable space which it covers outside of the edge of the pan, because it allows great freedom of escape for the steam and also allows a mingling of the air therewith, which modifies and improves the effect. The breadth of the annular space thus open may be varied within wide limits. The flaring form of the hood may be widely varied. It will serve well if cylindrical.

There may be four instead of three supports reaching out from the pan to sustain the top. The handles may be set higher and made to extend out horizontally, so as to serve as supports. Fig. 5 shows such a modification.

I claim as my invention—

A dish-heater composed of a water-containing vessel having a dish-support at the top of said vessel above the water-space thereof, so as to uphold a pile of plates or dishes in the moist atmosphere over the water with the edges of said plates or dishes above the top of said vessel, and also of a hood having an open bottom of larger diameter than the top of said vessel and larger also than the plates to rest on said support, so as to inclose a pile of plates or dishes on said support, substantially as described.

In testimony that I claim the invention above set forth I affix my signature in presence of two witnesses.

MARGARET WALSH.

Witnesses:
M. F. BOYLE,
J. B. CLAUTICE.